Patented June 20, 1944

2,351,664

UNITED STATES PATENT OFFICE 2,351,664

MANUFACTURE OF ESTERS

Frank O. Cockerille, Albemarle County, Va., assignor to E. I. du Pont de Nemours & Company, Wilmington, Del., a corporation of Delaware No Drawing. Application December 18, 1941, Serial No. 423,557

7 Claims. (Cl. 260—498)

This invention relates to the manufacture of vinyl and ethylidene esters by reacting acetylene with a carboxylic acid, and more particularly this invention is concerned with improving the efficiency of these reactions.

When one mol of acetylene is interacted with one mol of acetic acid under suitable catalytic conditions, one mol of vinyl acetate is formed but, in the presence of a large excess of acetic acid, a good deal of the vinyl acetate is at once converted into ethylidene diacetate. These reactions take place simultaneously and are governed by the composition of the acetic acid liquor through which the acetylene is passed and especially by the amount and type of catalyst, by the temperature, purity of the acetylene, etc. Under the most favorable conditions of operation as heretofore practiced, a substantial amount of undesirable side reactions takes place, chiefly to form high boiling polymeric compounds collectively termed "tars." Tar formation consumes acetic acid values which otherwise would result in useful products and it is therefore highly desirable that such tar formation should be reduced to a minimum.

Substitution of methane trisulfonic acid for the sulfoacetic and methionic acids previously used in the catalyst mixture was found to be beneficial in improving the yield and in reducing the formation of tar (see U. S. Patent No. 2,254,212 to Dinwiddie). However, even with this improvement, conditions favoring a good yield of the desired reaction products, especially vinyl acetate, are critical in the extreme and are easily unbalanced. The introduction of a mere trace of some impurity, for example, may poison the catalyst or otherwise affect the reaction so that the yield may be cut seriously with an enormous increase of tar.

My invention therefore has as its principal object the provision of an improved process for reacting acetylene with a carboxylic acid to form vinyl and ethylidene esters. A further object is to effect the absorption interaction of acetylene and carboxylic acid with a minimum formation of tar. A still further object of my invention is to render the absorption interaction of acetylene and carboxylic acids less critical and more amenable to commercial practice with an attendant increase in efficiency. Still another object is to influence the absorption reaction of acetylene and acetic acid in favor of an increase in the proportionate yield of vinyl acetate. The above and other objects will more clearly appear as the description develops.

These objects are accomplished by my invention which, briefly stated, comprises adding a small amount of quaternary onium compound to the absorber liquor commonly used in the manufacture of vinyl and ethylidene esters.

I have found that the addition of a small amount of a quaternary onium compound serves to greatly reduce the critical nature of these reactions and increase the efficiency thereof by suppressing tar formation.

The quaternary onium compounds of this invention may be defined as those containing a pentavalent atom of group V of the periodic table, e. g., nitrogen, phosphorus, arsenic and antimony, wherein four valences are satisfied by carbon and the fifth valence is satisfied by an anion. As specific compounds falling within this definition that are particularly satisfactory may be mentioned the tetraalkyl ammonium salts such as tetraethyl ammonium acetate, tetrapropyl ammonium sulfate, triamyl ethyl ammonium acetate, triamyl methyl ammonium sulfate, trimethyl cyclohexyl ammonium acetate, and triethyl cyclohexyl ammonium sulfate; the trialkyl monoaryl ammonium salts, such as trimethyl phenyl ammonium acetate and triethyl phenyl ammonium sulfate; the trialkyl monoaralkyl ammonium salts, such as trimethyl benzyl ammonium acetate, triethyl benzyl ammonium acetate and triamyl benzyl ammonium acetate; the alkyl pyridinium salts such as ethyl pyridinium acetate; the alkoxyalkyl trialkyl ammonium salts; the alkoxyalkyl dialkyl monoaryl ammonium salts; the betaines; the quaternary morpholinium and piperidinium compounds; the quaternary phosphonium compounds such as tetramethyl phosphonium acetate, tetraethyl phosphonium acetate; and the quaternary arsonium compounds such as tetraethyl arsonium acetate.

The quaternary onium compounds may be in the form of a salt such as the acetate, propionate, butyrate, sulfate, methane trisulfonate, etc., or may be added to the reaction liquor in the form of the hydroxide. Instead of the pure compound, it may be advantageous to use an impure form or a solution containing the desired compound in any state of purity.

It is generally desirable to use quaternary onium compounds containing one aromatic group for the presence of one aromatic group is advantageous in decreasing the toxicity of the compound to the mercury catalyst in the reaction liquor. As a rule, the quaternary ammonium compounds are the most toxic, the quaternary phosphonium compounds less toxic, and the quaternary arsonium compounds still less toxic. Inasmuch as toxicity is also greater in the case of low molecular weight compounds, the tetramethyl ammonium compounds should generally be avoided for this reason. As a rule, preferred compounds may be defined as those containing not less than 5 carbon atoms, nor more than 18 carbon atoms. Salts or other compounds containing the following cations are preferred: trimethyl phenyl ammonium-, dimethyl ethyl phenyl ammonium-, methyl diethyl phenyl ammonium-, and triethyl phenyl ammonium-. The alkyl or aryl group may be substituted, the substituent atom or group being hydroxyl, halogen, carboxyl or nitrile.

Only a very small amount of the quaternary onium compound need be used to give a marked improvement in the reaction. The useful range of concentrations is between about 0.001 and about 0.02 mol per liter, although preferably the concentration should be between about 0.002 and about 0.01 mol per liter of the absorber mixture. It should also be understood that an equivalent molecular amount of the sulfo-acid catalyst should also be added over and above that normally used, in order to neutralize a strongly basic onium radical.

The following examples are given to further illustrate this invention.

*Example I*

A flask equipped with an efficient agitator and a reflux condenser was charged with 475 ml. glacial acetic acid (M. P. 16.4° C.), 20 ml. 95% acetic anhydride, 5 grams crystalline mercury sulfate, 0.5 gram (0.004 mol per liter) trimethyl-phenyl-ammonium acid sulfate, and 1.0 gram (0.007 mol per liter) methane trisulfonic acid. The temperature of the mixed ingredients was raised to 85° C. (±5°) while a slow stream of carefully dried acetylene was passed over the surface to flush out inert gases. The agitator was started and acetylene passed in as needed to maintain a pressure of about 1 lb. per square inch in excess of atmospheric, the rate of acetylene consumption being read from a flow meter. It was observed that no absorption occurred during the first several minutes. Then absorption was noted at an increasing rate, which reached nearly three liters per minute about 15 minutes after the agitation was started. The temperature was held between 90° and 95° C. during the absorption. The rate decreased gradually, and the absorption was stopped about one hour after the highest rate was attained. It was found that the product consisted, after neutralization with sodium acetate and filtration to remove insoluble sludge and mercury compounds, of about 68% ethylidene diacetate, about 11% vinyl acetate, 1% acetic anhydride, 0.6% nonvolatile residue, and the remainder acetic acid. A control run, from which the quaternary ammonium salt was omitted, yielded a product containing about 75% ethylidene diacetate, about 3% vinyl acetate, 1% acetic anhydride, and 1.2% nonvolatile residue.

*Example II*

A charge like that in Example I was prepared except that the mercury sulfate was omitted and only 425 ml. of acetic acid were used. After the temperature had reached 80° C. (±5°), the agitator was started, and a solution containing 5% of mercuric acetate in glacial acetic acid was added, starting with 3 ml. and continuing at intervals of several minutes with portions of 1 to 2 ml. as required to maintain a satisfactory rate of absorption. A total of 50 ml. of the mercuric acetate solution was used. In general, the characteristics of the absorption reaction were similar to those observed when the mercury was used in the form of sulfate. The yields of both ethylidene diacetate and vinyl acetate were higher than in Example I, being about 76% and about 14% of the final mixture, respectively. Only 0.5% of anhydride was found, and the nonvolatile residue was 0.4%. A control charge with mercuric acetate catalyst gave a product which contained about 85% ethylidene diacetate, about 5% vinyl acetate, 0.5% anhydride, and 1.0% nonvolatile residue.

*Example III*

Charge and procedure like Example I except that only 0.25 gram (0.002 mol per liter) trimethyl-phenyl-ammonium acid sulfate was used. The product contained about 72% ethylidene diacetate, about 8% vinyl acetate, 1% anhydride, and 0.7% nonvolatile residue.

*Example IV*

Charge and procedure like Example II, except that only 0.25 gram (0.002 mol per liter) trimethyl-phenyl-ammonium acid sulfate was used. The product contained about 79% ethylidene diacetate, about 11% vinyl acetate, 0.5% anhydride, and 0.55% nonvolatile residue.

*Example V*

The absorber was charged as in Example II, except that 0.5 gram (0.006 mol per liter) ethyl-pyridinium acetate was substituted for the 0.5 gram trimethyl - phenyl - ammonium sulfate. There was no change in schedule of temperatures, addition of catalyst, etc. The product contained about 78% ethylidene diacetate and about 12% vinyl acetate, 0.5% anhydride, and 0.35% nonvolatile residue.

It is understood, of course, that the above examples are merely for purposes of illustration and my invention is not restricted to the exact conditions and agents disclosed in the examples, but is susceptible to a wide variation which will be immediately obvious to persons skilled in the art. For example, the permissible range of pressure is that heretofore generally employed in the manufacture of vinyl and ethylidene esters. It has been found, however, that much higher temperatures can be tolerated without injuring the mercury catalyst which enables operations to be carried out over a much wider temperature range without difficulties developing. Furthermore, this invention is applicable in the formation of vinyl and ethylidene esters other than the vinyl and ethylidene acetate specifically mentioned; vinyl propionate, vinyl butyrate, ethylidene dipropionate, and ethylidene dibutyrate are but a few examples of other esters which may be prepared in accordance with my invention.

By the practice of this invention, the formation of tar is greatly reduced, being no more than about half of that normally obtained. It is also to be noted that the ratio of ethylidene diacetate to vinyl acetate in the end product is considerably changed, the amount of vinyl acetate in the product being approximately three times that obtained when no quaternary ammonium compound is added to the absorber liquor.

I claim:

1. In the manufacture of vinyl and ethylidene esters wherein acetylene is reacted with a carboxylic acid whereby to form said esters, the improvement which comprises reacting the acetylene and carboxylic acid in the presence of a compound of a pentavalent atom of the group consisting of nitrogen, phosphorus, arsenic and antimony wherein four valences are satisfied by a linkage to carbon and the fifth valence is satisfied by an anion.

2. In the manufacture of vinyl and ethylidene esters wherein acetylene is reacted with a carboxylic acid whereby to form said esters, the improvement which comprises carrying out the reaction in the presence of from about 0.001 to about 0.02 mol of a compound of a pentavalent atom of the group consisting of nitrogen, phosphorus, arsenic and antimony wherein four valences are satisfied by a linkage to carbon and the fifth valence is satisfied by an anion, per liter of reaction mixture.

3. In the manufacture of vinyl and ethylidene esters wherein acetylene is reacted with a carboxylic acid whereby to form said esters, the improvement which comprises carrying out the reaction in the presence of from about 0.001 to about 0.02 mol of a compound of a pentavalent atom of the group consisting of nitrogen, phosphorus, arsenic and antimony wherein four valences are satisfied by a linkage to carbon and the fifth valence is satisfied by an anion, per liter of reaction mixture, said compound containing one aromatic group.

4. The process of preparing vinyl acetate and ethylidene diacetate which comprises reacting acetylene with acetic acid in the presence of from about 0.001 to about 0.02 mol of a compound of a pentavalent atom of the group consisting of nitrogen, phosphorus, arsenic and antimony wherein four valences are satisfied by a linkage to carbon and the fifth valence is satisfied by an anion, per liter of reaction mixture.

5. A process according to claim 1 wherein the quaternary onium compound is a quaternary ammonium compound.

6. A process according to claim 2 wherein the quaternary onium compound is a quaternary ammonium compound.

7. A process of preparing vinyl acetate and ethylidene diacetate which comprises reacting acetylene and acetic acid in the presence of from about 0.002 to about 0.01 mol of a quaternary ammonium compound.

FRANK O. COCKERILLE.

CERTIFICATE OF CORRECTION.

Patent No. 2,351,664. June 20, 1944.

FRANK O. COCKERILLE.

It is hereby certified that error appears in the printed specification of the above numbered patent requiring correction as follows: Page 3, second column, line 15, claim 5, for the claim reference numeral "1" read --2--; line 18, claim 6, for the claim reference numeral "2" read --3--; and that the said Letters Patent should be read with this correction therein that the same may conform to the record of the case in the Patent Office.

Signed and sealed this 29th day of August, A. D. 1944.

(Seal)

Leslie Frazer
Acting Commissioner of Patents.